Figure 1:
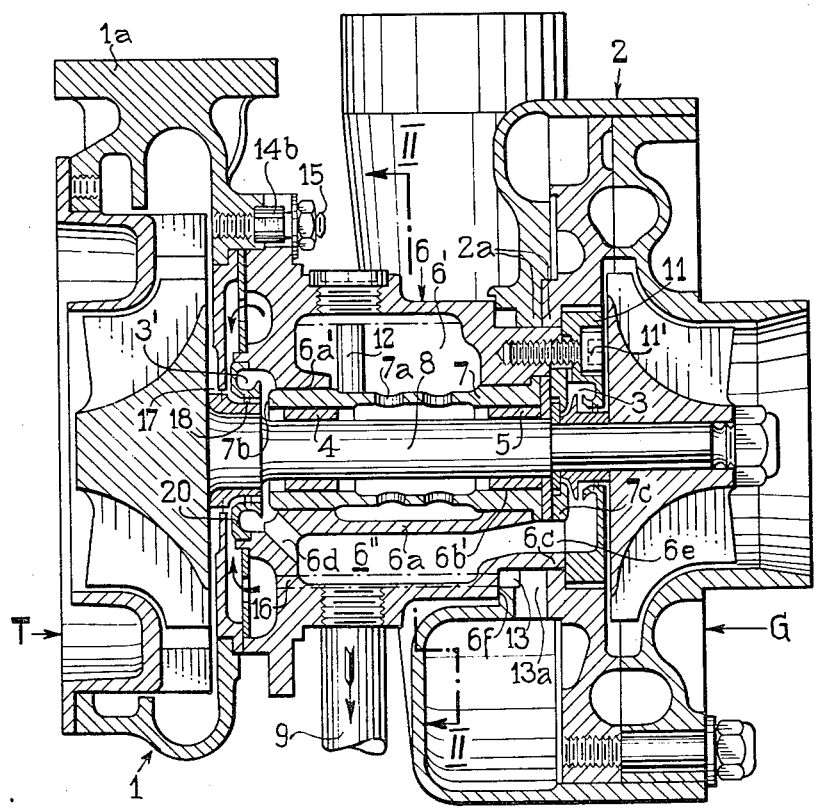

United States Patent Office 3,054,554
Patented Sept. 18, 1962

3,054,554
TURBO-BLOWER
Alfred Johann Büchi, Archstrasse 2,
Winterthur, Switzerland
Filed Dec. 30, 1960, Ser. No. 79,929
5 Claims. (Cl. 230—116)

The present invention relates to a turbo-blower consisting of a turbine and a centrifugal blower arranged in spaced relationship to the turbine and comprising an intermediate casing serving as an oil and bearing casing, to which the oil is supplied under pressure, and means for mounting the driving shaft. The invention resides in that that the intermediate casing is subdivided into an oil pressure chamber in which the oil is subject to the supply pressure, and an oil collecting chamber in which the oil leaving the bearing points is received and further conveyed, while the oil pressure chamber is formed with an aperture for two spaced bearing points of the driving shaft and a compound bearing bush embracing the bearing points, the wall of the compound bearing bush having between the bearing points apertures through which the interior of the bush or sleeve between the bearing points forms a commom space with the oil pressure chamber in such manner that the driving shaft runs in pressure oil in the central part of the compound bearing bush, and the bearing points are axially fed with the pressure oil.

There may be provided between the oil pressure and the oil collecting chamber a tube connection which comprises a nozzle channel which serves as an oil overflow channel and, when the pressure oil level falls below the mouth of the nozzle channel, serves as a pressure equalising channel which equalises the pressure in the pressure oil chamber with the atmospheric pressure in the oil collecting chamber.

The intermediate casing and the turbine casing are preferably assembled by securing means which are adapted to permit stepwise turning of the turbine casing in relation to the intermediate casing. It is advantageous to provide above the periphery at the end of the intermediate member radially directed slots, and to provide for securing the turbine casing to the intermediate casing, screws which comprise a cylindrical portion which is in contact with the slot edges, in such manner that on thermal expansion of the turbine casing the latter is guided in the slots in the intermediate casing by means of the cylindrical portion of the screws, so that the centering of the turbine casing in relation to the rotor is maintained.

The intermediate casing is advantageously assembled with the blower casing by providing the intermediate casing with a cylindrical portion stepped along its outer periphery, which fits into a cylindrical recess in the blower casing, so that the latter can be rotated as desired in relation to the intermediate casing, whereafter the blower casing set to the desired position is securely connected to the intermediate casing by means of a pressing device.

It is furthermore advantageous to provide between the blower casing and the intermediate casing an annular passage which communicates with the interior of the blower casing through a passage and to provide ducts extending from the annlar puassage and leading into an annular space provided on the turbine side, which annular space communicates on the one hand with the packing point for the propellent gases on the turbine side and on the other hand with the packing point on the turbine side for the lubricating oil for the supply of blocking air to these two packing points.

An embodiment of the invention is hereinafter more fully described by way of example.

Figure 2:
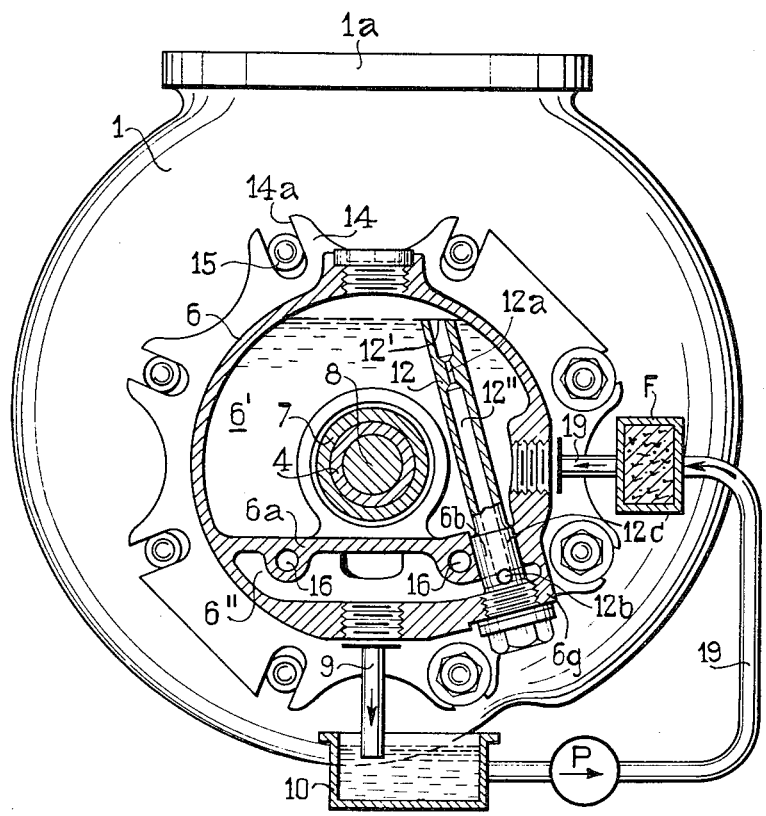

FIGURE 1 is an axial section through the turbo-blower according to the invention, and FIGURE 2 is a cross-section along the line II—II of FIGURE 1.

Referring to the figures, the turbine is denoted by T and the blower by G. The said turbine and the said blower are described in U.S. Patent Applications Serial Nos. 47,667 and 734,666. Situated therebetween is the intermediate casing 6, which constitutes, together with its attachment on the turbine side and on the blower side, the main subject of the invention. The intermediate casing comprises an upper oil chamber 6′ and a lower oil chamber or collecting space 6″. The upper oil chamber 6′ is employed as a pressure oil chamber, in which lubricating and cooling oil are subject to the supply pressure of an oil pump. The lower oil chamber 6″ is separated from the upper oil chamber by a partition 6a and is employed as a chamber for the collection of oil leaving the bearings, which is gravity-fed therefrom to the inlet of an oil pump P. The said oil enters the said oil pump P through the pipe 9 and the oil bath 10 (see FIGURE 2), which is connected with the pump P. This illustration is only of diagrammatic character. The duct 19 connects the pressure side of the pump P to the oil pressure chamber 6′. An oil filter F is provided in the duct 19. When the turbo-blower is employed as a turbo-supercharger of an internal combustion engine with a common oil system, the oil bath 10 corresponds to the crankshaft casing of the engine and P to the oil pump of the engine.

The end walls of special design at the ends of the intermediate casing are formed with apertures 6a′, 6b′ which form with a part of the upper oil pressure chamber an aperture extending along a common centre line in the intermediate casing 6 for the driving shaft 8. Disposed in the aperture is a compound bearing bush or sleeve 7, in which two bearing points 4 and 5 for the driving shaft 8 are provided in spaced relationship. The interior of the compound bush or sleeve between the bearing points communicates through apertures 7a with the oil pressure chamber 6′ and forms a part of the latter. The driving shaft 8 extends centrally through the compound bush and runs between the bearing points in the pressure oil. The oil pressure chamber 6′ is connected to the oil collecting chamber 6″ through the bearing points. This connection to the collecting chamber extends through the end 7b of the compound bush 7 on the turbine side and the thrust bearing 7c on the blower side and the corresponding throw-off devices. Annular channels 3, 3′ are provided for the lubricating oil thrown off therefrom. The annular channels are connected to the oil collecting chamber 6″ through the passages 6d and 6e in the wall of the oil collecting chamber. The bearing points are constantly fed with lubricating and cooling oil through the central part of the compound bearing bush during operation.

The oil pressure chamber 6′ is connected to the oil collecting chamber through a pipe 12. The arrangement is illustrated in FIGURE 2. The pipe 12 terminates in the upper part of the chamber 6′ close to the upper part of the wall. The pipe 12 serves on the one hand as an oil overflow and on the other hand to effect pressure equalisation between the pressure in the chambers 6′ and 6″ when the level of the lubricating oil falls below its mouth 12′. If, for example, the turbo-blower is employed as a turbo-supercharger of an internal combusion engine, in which case the lubricating oil supply pipe 19 is fed by the oil pump P of the engine, the turbo-blower driven by the exhaust gases of the engine is stopped when the engine is switched off and the supply of oil through the oil supply duct 19 is interrupted. The oil level in the oil chamber 6′ falls below the mouth 12′ of the pipe 12. The pressure in the chamber 6′ is then made equal to the atmospheric pressure in the chamber 6″ through the nozzle channel 12″ in the pipe 12. The air supplied by the oil supply duct together with the oil is also discharged with the surplus oil into the chamber 6'. The nozzle channel 12" in the pipe 12 also has a calibrated bore 12a and is connected to the oil collecting chamber 6" through bores 12b. The pipe is tightly screwed to the end 6g of the chamber 6" and extends at the part 12c through the bore 6b in the partition 6a in well packed fashion.

The particular manner in which the intermediate casing is secured to the turbine can best be seen from FIGURE 2. Means are provided to ensure that the thermal expansion of the hot turbine casing takes place centrally in relation to the intermediate casing and that no stresses are set up in the material. For this purpose, the turbine casing 1 is secured to the central casing 6 by means of radial extensions 14 formed with radially extending slots, of which the edges 14a serve as a guide means for screws 15 of particular design. The cylindrical portions 14b of the said screws 15 move in the slot 14a with the expanding turbine casing 1. In the present constructional example, eight such securing points 14/15 are provided at regular intervals over 360° on a central pitch circle on the intermediate casing. Depending upon the number of securing points, the turbine casing may be rotated in steps in relation to the intermediate casing. The direction of the inlet branch 1a may vary.

For securing the blower casing 2 to the intermediate casing, annular flanges 2a directed radially inwards are provided on parts of the casing of the blower, which are pressed by means of screws 11' together with a disc-shaped structural part 11 one against the other and against the intermediate casing 6. For this purpose, a cylindrical end portion 6c and an annular step 6f are provided on the intermediate casing. Before the pressing operation is effected by means of the screws 11', the blower casing can be rotated in either direction on the cylindrical end portion 6c of the intermediate casing 6, so that the outlet branch of the blower is brought into the desired direction.

In front of the shoulder or step 6f on the intermediate casing and the flange 2a on the adjacent portion of the casing of the blower, a ring-shaped channel 13 is formed by means of an annular recess in the latter part. The said ring-shaped channel is connected on the one hand to the pressure chamber of the blower through a channel 13a and on the other hand to the rear side of the turbine casing by means of one or more axially extending channels 16. This arrangement serves for the supply of blocking air to the packing points 17 and 18 for the propellent gases of the turbine and of the annular channel casing 20 for the oil thrown off from the bearing point 4 on the turbine side into the annular channel 3'. The blocking air is guided between the two aforesaid packings, as indicated by arrows in FIGURE 1. The blocking air also serves to cool the end of the intermediate casing closer to the turbine.

What I claim is:

1. A turbo-blower including a turbine, a centrifugal blower arranged in spaced relationship to the turbine, a driving shaft for the turbine and the blower, a casing intermediate the turbine and blower serving as an oil and bearing means casing, means subdividing the casing into an oil pressure chamber and an oil collecting chamber, means for supplying oil under pressure to the oil pressure chamber, a pair of spaced apart bearing means for the driving shaft, a sleeve embracing the bearing means and radially spaced from the driving shaft for defining an inner space axially between the bearing means, means mounting the sleeve in the oil pressure chamber, said sleeve having openings therein intermediate the bearing means placing the inner space in communication with the oil pressure chamber whereby said bearing means are supplied with oil from the oil pressure chamber, and means defining a communication path between the outer end of each of the bearing means and the oil collecting chamber whereby oil leaving said bearing means is conveyed into the oil collecting chamber.

2. A turbo-blower including a turbine, a centrifugal blower arranged in spaced relationship to the turbine, a driving shaft for the turbine and the blower, a casing intermediate the turbine and blower serving as an oil and bearing means casing, partition means in said casing located below said driving shaft for dividing the interior of the casing into an oil pressure chamber occupying the greater portion of the casing and an oil-collecting chamber radially outward of the oil pressure chamber, means for supplying oil under pressure to the oil pressure chamber, a pair of spaced apart bearing means for the driving shaft, a sleeve embracing the bearing means and radially spaced from the driving shaft for defining an inner space axially between the bearing means, said sleeve having openings therein intermediate the bearing means for placing the inner space in communication with the oil pressure chamber whereby said bearing means are supplied with oil from the oil pressure chamber, and means defining a communication path between the outer end of each of the bearing means and the oil collecting chamber whereby oil leaving said bearing means is conveyed into the oil collecting chamber.

3. A turbo-blower according to claim 1, including a pipe connection between the oil pressure chamber and the oil collecting chamber, said connection comprising a nozzle channel which serves as an oil overflow channel and, upon lowering of the level of the oil in the pressure chamber below the mouth of the nozzle channel, serves as a pressure equalizing channel for equalizing the pressure in the oil pressure chamber with the atmospheric pressure in the oil collecting chamber.

4. A turbo-blower according to claim 1, in which said communication path defining means includes a throw-off device and an annular oil collecting chamber, and channel means connecting the annular chamber with the oil collecting chamber.

5. A turbo-blower according to claim 1, including means for securing the turbine to the intermediate casing, for the stepwise rotation of the turbine in relation to the intermediate casing.

References Cited in the file of this patent

UNITED STATES PATENTS

| Re. 24,810 | Buchi | Apr. 19, 1960 |
| 2,492,672 | Wood | Dec. 27, 1949 |
| 2,673,026 | Gerteis | Mar. 23, 1954 |
| 2,715,367 | Kodet et al. | Aug. 16, 1955 |